United States Patent [19]

Fujisaki et al.

[11] Patent Number: 4,753,315
[45] Date of Patent: Jun. 28, 1988

[54] AUTOMOBILE FRONT BODY SKELETON

[75] Inventors: Yasuhiro Fujisaki; Takeshi Edahiro, both of Hiroshima, Japan

[73] Assignee: Mazda Motor Corporation, Hiroshima, Japan

[21] Appl. No.: 823,540

[22] Filed: Jan. 29, 1986

[30] Foreign Application Priority Data

Feb. 6, 1985 [JP] Japan .................................. 60-22329

[51] Int. Cl.$^4$ .............................................. B60K 5/12
[52] U.S. Cl. .................................... 180/299; 180/292; 180/297; 180/312; 296/194
[58] Field of Search ............... 180/291, 292, 297, 299, 180/312; 296/194, 204

[56] References Cited

U.S. PATENT DOCUMENTS

| 792,704 | 6/1905 | Harrington | 180/292 |
| 1,111,915 | 9/1914 | McKeen et al. | 180/312 |
| 1,358,670 | 11/1920 | Alborn | 180/292 |
| 2,705,660 | 4/1955 | Giacosa | 296/204 |
| 4,392,545 | 7/1983 | Harasaki et al. | 180/297 |
| 4,406,343 | 9/1983 | Harasaki | 180/297 |

FOREIGN PATENT DOCUMENTS 58-35471  3/1983  Japan .................................. 180/297

Primary Examiner—John J. Love
Assistant Examiner—Eric Culbreth
Attorney, Agent, or Firm—Burns, Doane, Swecker & Mathis

[57] ABSTRACT

An automobile front body skeleton comprises a main frame structure, including a pair of spaced side frames, a front cross member and a rear cross member, and a subframe structure secured to the main frame structure for the support of an automobile power plant. The subframe structure comprises a pair of spaced longitudinal frame members extending between, and secured to, the front and rear cross member, and a transverse frame member extending generally parallel to and adjacent the front cross member. Either each longitudinal frame member or the transverse frame member is secured to the side frames.

8 Claims, 4 Drawing Sheets

AUTOMOBILE FRONT BODY SKELETON

BACKGROUND OF THE INVENTION

The present invention generally relates to an automobile body structure and, more particularly, to a front body skeleton of the automobile body structure.

Some conventional automobiles of front-wheel drive, front-engine formula (FF type) employ a subframe structure load beneath the front engine compartment for the support of an automobile power plant, wheel suspension arms and related components. According to, for example, Japanese Laid-open Utility Model Publication No. 58-35471, load open to public inspection in 1983, the subframe structure disclosed therein comprises a pair of spaced longitudinal frames extending in a direction parallel to the longitudinal sense of the automobile, and a pair of spaced transverse frames extending in a direction parallel to the widthwise sense of the automobile, all of the frames being joined together so as to represent a generally rectangular configuration.

More specifically, the longitudinal frames are connected at one end with one of the transverse frames, that is, the front cross frame, and at the other end with a dashboard lower cross member rigidly secured to a dashboard. Each of the longitudinal frames has a pair of spaced brackets welded, or otherwise ridigly secured, thereto for the support of a respective front wheel suspension arm. The other of the transverse frames, that is, the rear cross frame, has its opposite ends rigidly connected with, or otherwise welded to, respective portions of the longitudinal frames generally between the associated brackets so as to extend generally parallel to the front cross frame.

The subframe structure of the above described construction is in turn connected with a main frame structure including a pair of spaced side frame members extending lengthwise of the automobile body structure.

The front body skeleton disclosed in the above mentioned publication has been found having a problem in that the freedom of choice of the engine mounting layout is unnecessarily limited because of the presence of the rear cross frame and, in particular, because the position of the rear cross frame comes immediately beneath the automobile power plant.

Moreover, since it appears that the subframe structure is connected to the main frame structure, used to reinforce the automobile body structure as a whole, by the use of connecting bolts, one bolt for the joint between each end of the front cross frame and the adjacent side frame member, another one for the joint between one of the longitudinal frames and the dashboard lower cross member, and the last one for the joint between the other of the longitudinal frames and the dashboard lower cross member, not only does the subframe structure appear to lack a sufficient rigidity, but also the subframe structure fails to provide a ridigity to the automobile body structure as a whole.

SUMMARY OF THE INVENTION

The present invention has been developed with a view to substantially eliminating the above discussed problems inherent in the prior art automobile front body skeleton and has for its essential object to provide an improved automobile front body skeleton which has a sufficient rigidity and which is effective to provide a rigidity to the automobile body structure as a whole even though one of the transverse frames, that is, the rear cross frame, such as used in the prior art front body skeleton is not utilized.

Another object of the present invention is to provide an improved front body skeleton of the type referred to above, with which the relatively large freedom of choice of engine mounting layout can be appreciated and which is easy and less time-consuming to fabricate.

In order to accomplish these objects, the subframe structure in a preferred form of embodiment of the present invention is constituted by a pair of spaced longitudinal frame members extending in a direction parallel to the longitudinal direction of the automobile between the front cross member and the dashboard lower cross member, and a transverse frame member bridging between the spaced longitudinal frame members at a location adjacent the front cross member. In this subframe structure, one of each longitudinal frame member and the transverse frame member is fixed to the respective side frame at a respective point lying in line with the transverse frame member, and each of the longitudinal frame members has a rear end remote from the transverse frame member connected to the dashboard lower cross member at two locations spaced a distance from each other in a direction lengthwise of the dashboard lower cross member.

Thus, according to the present invention, the subframe structure is connected with the main frame structure (comprising the front cross member, the dashboard lower cross member and the spaced side frames) at the opposite ends of each of the longitudinal frame members and at the spaced points lying in line with the transverse frame member. In particular, the connection between the rear end of each of the longitudinal frame members with the dashboard lower cross member is achieved by the use of two bolts to make the subframe structure rigid with the main frame structure. Accordingly, even though no rear cross frame such as used in the prior art front body skeleton is employed, the rigidity of both the subframe structure and the automobile body structure as a whole can be advantageously increased.

BRIEF DESCRIPTION OF THE DRAWINGS

These and other objects and features of the present invention will become readily understood from the following description of preferred embodiments of the present invention made with reference to the accompanying drawings, in which.

DETAILED DESCRIPTION OF THE EMBODIMENTS

Figure 1:
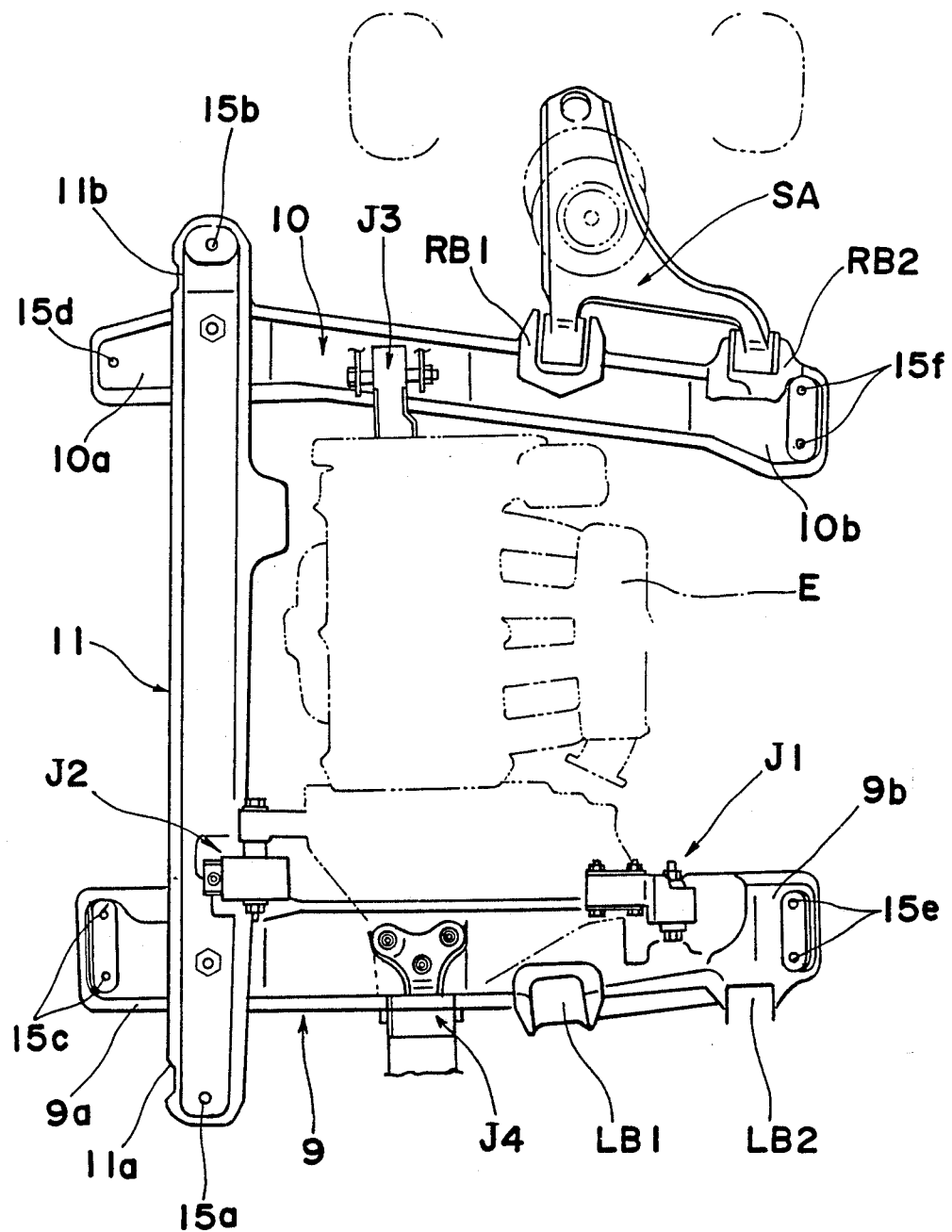
FIG. 1 is a top plan view of a subframe structure constructed according to a preferred embodiment of the present invention.

Before the description of the present invention proceeds, it is to be noted that like parts are designated by like reference numerals throughout the accompanying drawings.

Referring first to FIGS. 1 to 6, an automobile front body structure of an automobile of FF type is generally identified by 1. The front body structure 1 has an engine compartment 2 defined therein for accommodating an automobile power plant E, shown by the phantom line in FIGS. 1 and 2, and is separated from a passenger's compartment 3 by a dashboard or front bulkhead 4. The automobile body structure includes a pair of spaced side frames (only one of which is shown by 5 in the form of a right-hand side frame as viewed in a direction of forward travel of he automobile) extending in spaced relation to each other in a direction lengthwise of the automobile, respective front ends of said side frames 5 being connected together by means of a front cross member 6. Respective portions of the side frames 5 are also connected together by means of a generally U-sectioned dashboard lower cross member 7 which extends beneath, and is welded to, a lower region of the dashboard 4 so as to provide a generally closed hollow between the lower cross member 7 and that lower region of the dashboard 4.

The side frames 5, the front cross member 6 and the dashboard lower cross member 8 altogether constitute a main frame structure reinforcing the automobile front body structure 1.

A subframe structure for the support of the power plant E and the front wheel suspension arms (only one suspension arm for a right-hand front wheel being shown by SA in FIG. 1), is generally identified by 8 and is arranged in a lower area of the engine compartment 2 and generally below the main frame structure. This subframe structure 8 comprises left-hand and right-hand tubular lonitudinal frames 9 and 10 of generally rectangular cross-section extending in a direction parallel to the longitudinal sense of the automobile in spaced relation to each other between the front cross member 6 and the lower cross member 7 and positioned adjacent to and inwardly of the side frames 5, and a tubular transverse frame 11 of generally rectangular cross-section extending between the longitudinal frames 9 and 10 adjacent the front cross member 6 and on one side of the front cross member 6 adjacent the engine compartment 2.

Figure 2:
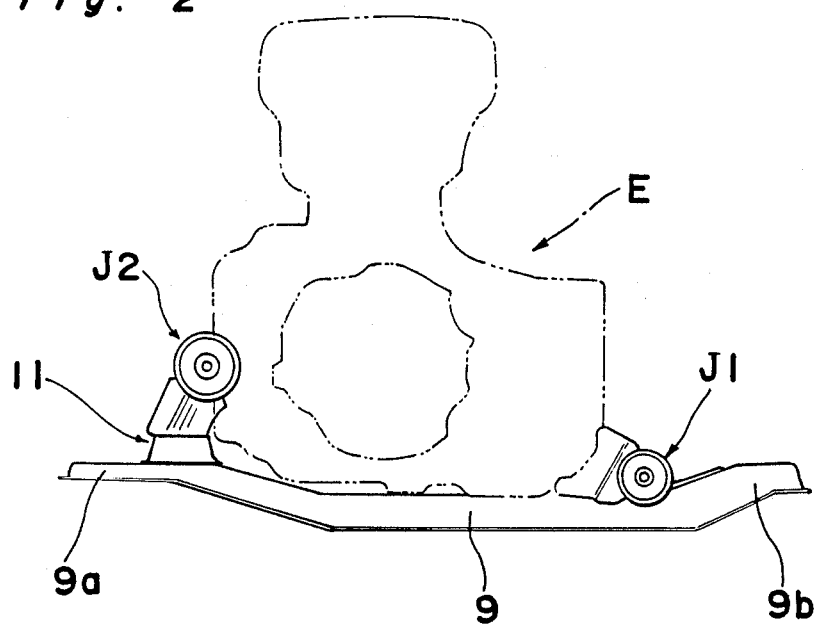
FIG. 2 is a side view of the subframe structure.
Figure 3:
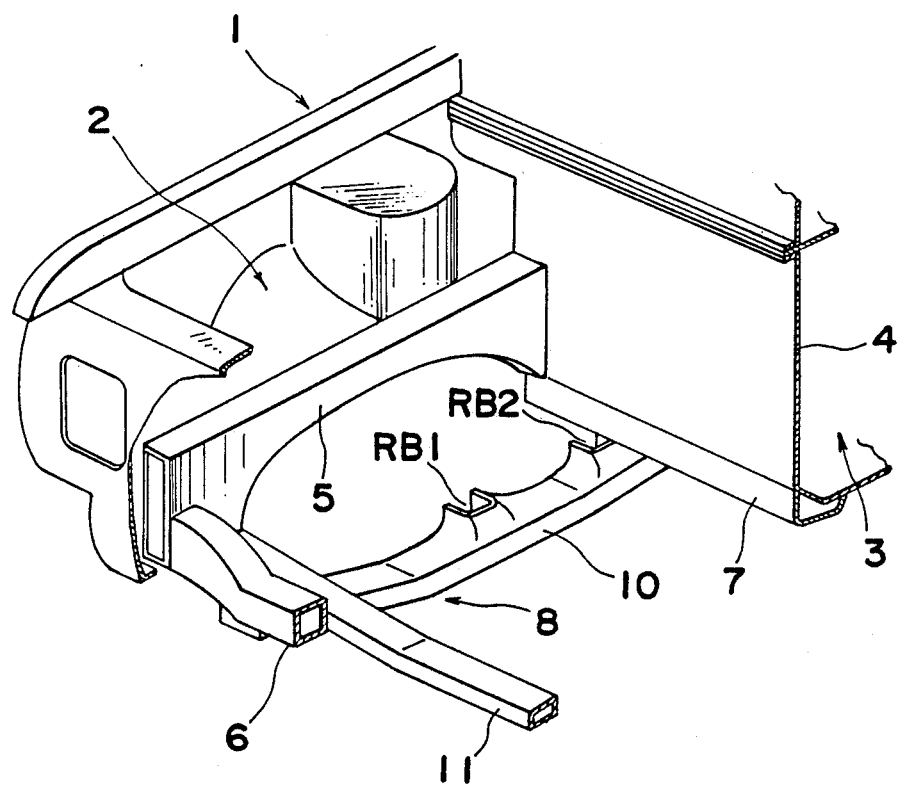
FIG. 3 is a fragmentary perspective view of an automobile front body structure showing a front body skeleton employing the subframe structure.
Figure 4:
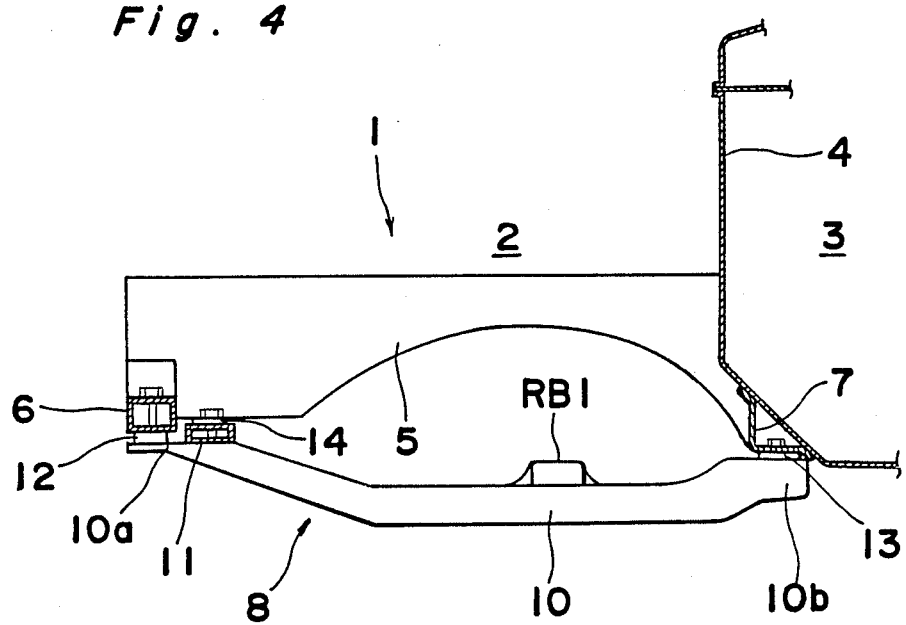
FIG. 4 is a schematic side sectional view of the automobile front body structure.

Each of the longitudinal frames 9 and 10 is depressed at a substantially intermediate portion thereof, as best shown in FIGS. 2 and 4, with its front and rear end portions consequently positioned at a level higher than the depressed intermediate portion, and has a pair of spaced, generally U-shaped bearing brackets LB1, LB2 or RB1, RB2 for the support of the respective suspension arm SA in a manner known to those skilled in the art.

Figure 5:
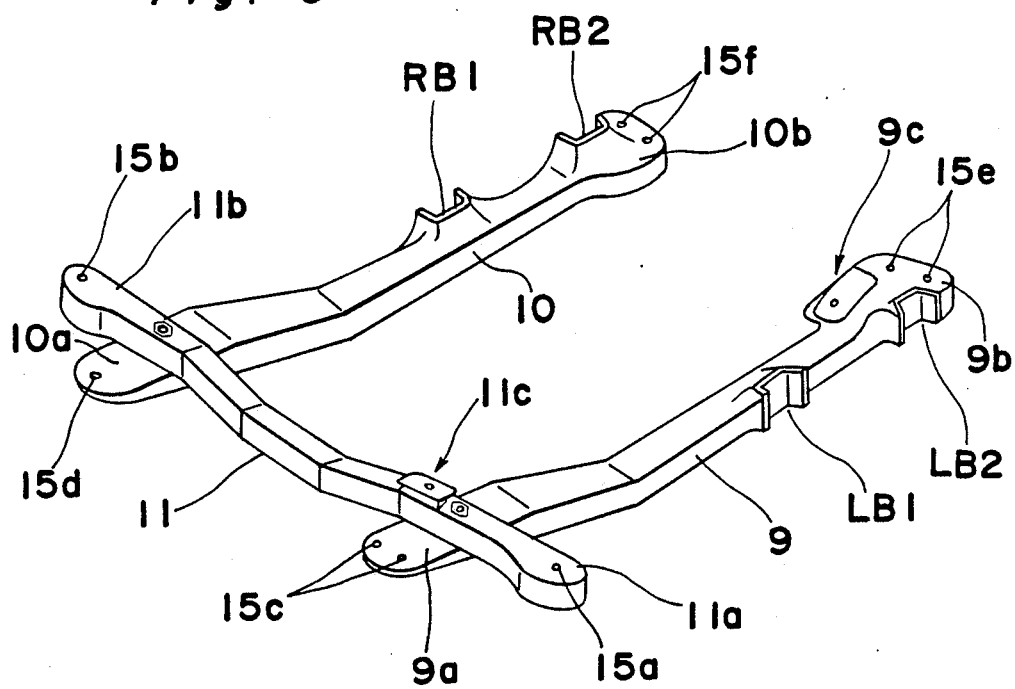
FIG. 5 is a perspective view of the subframe structure.
Figure 6:
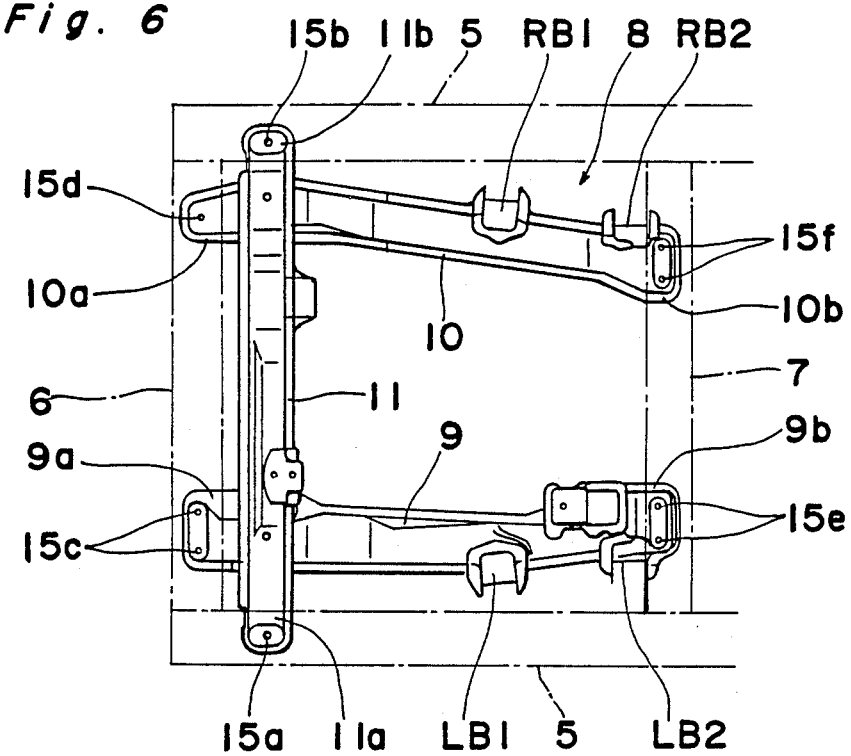
FIG. 6 is a top plan view of the subframe structure shown in relation to a main frame structure.

As shown in FIGS. 1 to 6, the transverse frame 11 has its opposite ends 11a and 11b rigidly bolted from below to the respective side frames 5 with elastic members 14 (see FIG. 4) interposed between the ends 11a and 11b and the respective side frames 5. For this purpose, the transverse frame 11 has a single bolt bearing hole 15a or 15b defined in each of the opposite ends 11a and 11b as best shown in FIGS. 1, 5 and 6. With the transverse frame 11 bolted to the side frames 5, the front end portion 9a or 10a of each of the longitudinal frames 9 and 10 is bolted from below to a respective portion of the transverse frame 11 spaced a distance inwardly from the adjacent end 11a or 11b. Thus, it will readily be seen that, while the transverse frame 11 spans the engine compartment 2 with its opposite ends 11a and 11b bolted from below to the respective side frames 5, the longitudinal frames 9 and 10 having their front end portions 9a and 10a bolted to the transverse frame 11 have their front extremities terminating on one side of the transverse frame 11 remote from the rear end portions 9b and 10b and immediately beneath the front cross member 6. In the embodiment shown in and described with reference to FIGS. 1 to 6, the transverse frame 11 has its opposite ends 11a and 11b protruding outwardly from the adjacent longitudinal frames 9 and 10 and terminating immediately beneath the respective side frames 5.

The front extremities of the respective longitudinal frames 9 and 10 terminating immediately beneath the front cross members 6 are bolted from below to the front cross member 6 with respective elastic members 12 (see FIG. 4) interposed therebetween. In particular, two bolts (not shown) are used to connect the front extremity of the left-hand longitudinal frame 9, whereas a single bolt (not shown) is used to connect the front extremity of the right-hand longitudinal frame 10. For this purpose, the front extremity of the left-hand longitudinal frame 9 has two bolt bearing holes 15c defined therein and spaced a distance from each other in a direction lengthwise of the front cross member 6, and the front extremity of the right-hand longitudinal frame 10 has a single bolt bearing hole 15d defined therein.

On the other hand, the rear ends 9b and 10b of the respective longitudinal frames 9 and 10, each having a width greater than the remaining portion of the associated frame 9 or 10, are bolted from below to the dashboard lower cross member 7 with respective elastic members 13 interposed therebetween as best shown in FIG. 4. Two bolts (not shown) are used to connect each rear end 9b or 10b to the dashboard lower cross member 7, and for this purpose, each of the rear ends 9b and 10b of the longitudinal frames 9 and 10 has two bolt bearing holes 15e or 15f defined therein.

In this front body skeleton constructed according to the present invention, the automobile power plant E is supported by means of a four-point support system in a cross mounted fashion (i.e., in a fashion in which the power plant is mounted with the longitudinal direction of the engine lying in a direction widthwise of the automobile). This four-point support system includes any known shock-absorbing pivot joint assemblies J1, J2, J3 and J4 each comprising at least two relatively movable parts operatively coupled together with the intervention of a cushioning member effective to absorb vibrations and to minimize the transmission of vibrations and impact shocks from one movable part to another. While one movable part of the respective pivot joint assemblies J1, J2, J3 and J4 are rigidly connected to different portions of the power plant E, the other movable parts of the joint assemblies J1 to J4 are mounted on respective portions of the longitudinal frame 9, the transverse frame 11 and opposite portions of the front body structure 1.

Therefore, the longitudinal frame 9 has a mounting area 9c defined therein adjacent the rear end 9b for receiving the joint assembly J1 and, the transverse frame 11 has a mounting area 11c defined therein adjacent the joint between the frames 9 and 11 for receiving the joint assembly J2. In this arrangement, it will readily be seen that most of the weight of the power plant E acts on the longitudinal frame 9, and therefore, while a single connecting bolt is used at each joint between the front extremity of the longitudinal frame 10 and the front cross member 6, between the left-hand end 11a of the transverse frame 11 and the left-hand side frame 5 and between the right-hand end 11b of the transverse frame 11 and the right-hand side frame 5, two connecting bolts are exceptionally used at the joint between the front extremity of the left-hand longitudinal frame 9 and the front cross member 6 as hereinbefore described.

Thus, in the foregoing embodiment, the subframe structure is rigidly connected with the main frame structure including the side frames 5, the front cross member 6 and the dashboard lower cross member 7, in such a way that the opposite ends of all of the frames 9, 10 and 11 forming the subframe structure are bolted to the main frame structure. In particular, the rear ends of each of the longitudinal frames 9 and 10 are rigidly secured to the lower cross member 7 by the use of the two connecting bolts spaced in a direction lengthwise of the lower cross member 7. Accordingly, the subframe structure 8 is rigidly connected with the main frame structure.

Moreover, in view of the fact that the joints between the front cross member and the left-hand longitudinal frame 9 and between the front cross member and the right-hand longitudinal frame 10, respectively, are inwardly reinforced by the front end portions 9a and 10a of the respective longitudinal frames 9 and 10 and the opposite ends 11a and 11b of the transverse frame 11 which are connected with the frame end portions 9a and 10a in a crossed fashion, each of the joints between the front cross member and the longitudinal frames 9 and 10 have an increased physical strength.

Figure 7:
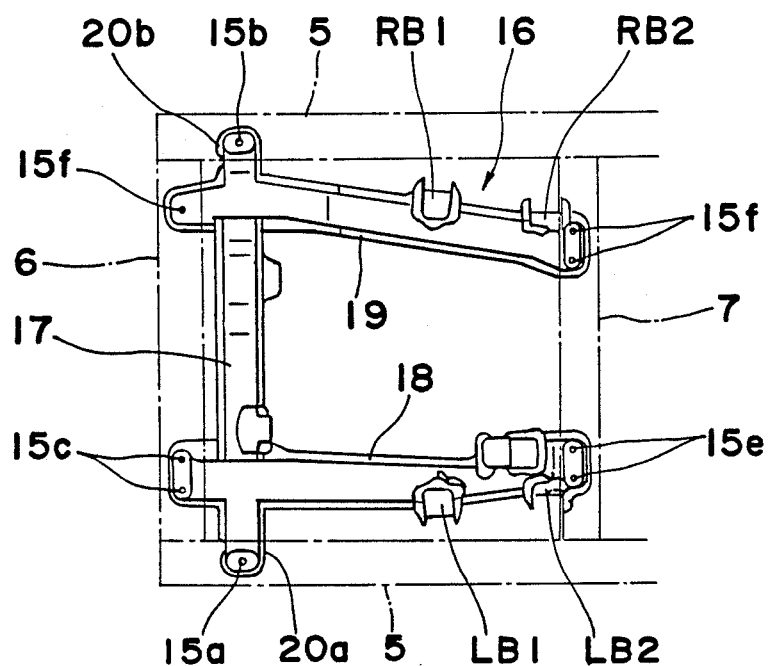
FIG. 7 is a view similar to FIG. 6, showing another preferred formed of embodiment of the present invention.

It is to be noted that, in the foregoing embodiment shown in and described with reference to FIGS. 1 to 6, the opposite ends 11a and 11b of the transverse frame 11 have been described as protruding outwards from the adjacent longitudinal frames 9 and 10 for connection with the associated side frames 5. However, in the embodiment shown in FIG. 7, the transverse frame, now identified by 17 in FIG. 7, is of a length sufficient to have its opposite ends terminating in rigid connection with the respective front end portions 9a and 10a of the longitudinal frames 9 and 10, while, the longitudinal frames 9 and 10 are integrally formed with respective lateral projections 20a and 20b protruding laterally outwardly from the front end portions 9a and 10a of the respective longitudinal frames 9 and 10 in alignment with the transverse frame 17. The bolt bearing holes 15a and 15b, which have been shown and described as formed in the respective opposite ends 11a and 11b of the transverse frame 11 in the foregoing embodiment, are formed in the lateral projections 20a and 20b, respectively, for connecting the longitudinal frames 9 and 10 to the adjacent side frames 5.

Even in the embodiment shown in and described with reference to FIG. 7, the subframe structure is rigidly connected with the main frame structure reinforcing the automobile body structure, and therefore, the rigidity of the subframe structure 8 as well as that of the automobile body structure as a whole can be advantageously increased as in the case with the foregoing embodiment.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automobile front body skeleton having an engine compartment defined therein for accommodating an automobile power plant, which skeleton comprises:
    a mainframe structure including a pair of spaced side frames extending lengthwise of an automobile;
    a front cross member extending in a lower region of the engine compartment in a direction widthwise of the automobile and in front of the automobile power plant with respect to the direction of forward travel of the automobile, said front cross member having its opposite ends secured to the adjacent side frames;
    a rear cross member secured to a lower portion of a dashboard extending in the lower region of the engine compartment in a direction widthwise of the automobile and on one side of the engine compartment remote from the front cross member, said rear cross member having its opposite ends secured to the adjacent side frames;
    a subframe structure arranged in the lower region of the engine compartment for support of the automobile power plant from below, said subframe structure including first and second spaced longitudinal frame members extending between the front and rear cross members, each of said first and second longitudinal frame members having opposite ends secured respectively to the front and rear cross members and being provided with bracket means for pivotably supporting a first suspension arm and a second suspension arm, respectively,
    the end of each of the longitudinal frame members secured to the rear cross member being formed with a plurality of spaced bolt bearing holes, and
    the end of each longitudinal frame member being secured to the rear cross member by a plurality of connecting bolts spaced from each other in a direction lengthwise of the rear cross member, said subframe structure further including a transverse frame member positioned adjacent the front cross member so as to extend generally parallel to the front cross member, said longitudinal frame members each being rigidly connected to said transverse frame member, the first and second longitudinal frame members being connected to mounting means for supporting a portion of the automobile power plant, each end of the first and second longitudinal frame members adjacent the front cross member being secured to the front cross member by a connecting bolt, the transverse frame member being located adjacent to and displaced from said front cross member in a direction generally lengthwise of each of the longitudinal frame members with opposite ends of the transverse frame member protruding axially outwardly from the rigid connections between the transverse frame member and the first longitudinal frame member and between the transverse frame member and the second longitudinal frame member, said opposite ends of the transverse frame member being in turn secured to said pair of spaced side frames, the ends of each of the first and second longitudinal frame members being secured to the front and rear cross members from below the front and rear cross members, said opposite ends of the transverse frame member being secured to the adjacent side frame from a position beneath the adjacent side frame by a further connecting bolt.

2. The skeleton as claimed in claim 1, wherein the end of each of the first and second longitudinal frame members adjacent the rear cross member has a width greater than that of the remaining portion of the respective longitudinal frame member, and the number of the bolts used to connect said end of each longitudinal frame member to the rear cross member is two.

3. The skeleton as claimed in claim 1, wherein each of the longitudinal and transverse frame members forming the subframe structure is a tubular member of closed cross-section.

4. The skeleton as claimed in claim 1, wherein each of the said bracket means includes a pair of spaced brackets formed therein and adapted to support a respective wheel suspension arm.

5. The skeleton as claimed in claim 1 wherein at least a portion of at least one of said longitudinal frame members and said transverse frame member has a closed cross-sectional configuration.

6. The skeleton as claimed in claim 1, wherein each of said first and second longitudinal frame members is secured respectively to the front and rear cross members through an elastic member and wherein the opposite ends of said transverse frame member is secured to the adjacent side frame through an elastic member.

7. The skeleton as claimed in claim 6, wherein the end of each of the first and second longitudinal frame members adjacent the rear cross member has a width greater than that of the remaining portion of the respective longitudinal frame member, and the number of the bolts used to connect said end of each longitudinal frame member to the rear cross member is two.

8. The skeleton as claimed in claim 6, wherein each of the longitudinal and transverse frame members forming the subframe structure is a tubular member of closed cross-section.

* * * * *